United States Patent Office 3,674,348
Patented July 4, 1972

3,674,348
PHOTOGRAPHIC SYSTEM FOR STEP-MOTION PROJECTOR
Erwin E. Figge, Des Plaines, and Edward J. Ho, Chicago, Ill., assignors to Bell & Howell Company, Chicago, Ill.
Filed June 22, 1970, Ser. No. 48,399
Int. Cl. G03b *31/00*
U.S. Cl. 352—84
9 Claims

ABSTRACT OF THE DISCLOSURE

A motion picture recording and projection system adapted for use with audio tape accompaniment including a camera and a projector. The camera, in response to selective actuation, exposes a portion of the film for a predetermined time interval and simultaneously exposes an elongated continuous strip along a margin of the film, corresponding to scenes to be projected at slow speed. The tape recorder runs for a time period which is considerably greater than the operational interval of the camera. During projection, the exposed film margin is detected and utilized to switch the projector drive mechanism from normal to slow speed operation. During slow speed operation the tape accompaniment is driven at its normal play-back and recording speed.

This invention generally relates to a photographic system which provides automatic slow or step-motion projection and more particularly relates to such a system which includes a means for providing accompanying audio presentation recorded upon a companion audio tape cassette recorder. The activation of the tape recorder is controlled by the projector upon the sensing of a transparent area along the margin of the film.

BACKGROUND OF THE INVENTION

The illustrated embodiment is particularly adapted for use with a motion picture projection system including a selectively actuable motion picture camera. The system further includes a selectively actuable sound recorder for recording on a magnetic medium, separate from the film, sound impressions accompanying at least selected ones of the visual impressions. During replay, the tape cassette is actuated in response to the sensing of a light transmitting area upon the margin of the film which actuates the recorder at the precise moment that the scene which corresponds to the recorded audio information, is displayed by the projector. In this manner, synchronization between the sound and the picture is obtained. Upon completion of the scene with which the audio presentation is associated, a sound burst, recorded upon the tape, is sensed and utilized to interrupt the operation of the tape recorder. A particular apparatus utilizing such operative features is described in the patent application entitled Sound Recorder Control, inventor—R. S. John, U.S. Ser. No. 735,731, filed June 10, 1968, and the application entitled Audio-Visual Recording and Display Methods and Apparatus, inventor—Joseph H. Lancor, Jr., U.S. Pat. No. 3,539,248, issued Nov. 10, 1970, each of said applications having a common assignee with this application.

The hereinafter described embodiment facilitates the projection of titles and still scenes at a relatively slow film rate thereby conserving the consumption of film. The slow projection rate, that is the step-motion projection, is accomplished with controlled sound accompaniment. This particular feature is desirable in that it allows the operator to adjust the film speed and usage to the subject matter.

Briefly, the camera is run at a conventional 18 frames per second speed and simultaneously the sound accompaniment is recorded upon the recording track of a tape cassette. As will hereinafter be described, the duration of the recorder operation exceeds the filming time by a predetermined amount so as to compensate for the reduced rate of projection. The projector includes an apparatus for sensing a unique control signal recorded upon the film which indicates the commencement of a film saver scene. In response to the start of the film saver scene, the tape recorder is started to reproduce the audio accompaniment. The main object of this invention is to provide a motion projector system wherein both conventional 18 frame per second as well as slow projection, 2 frames per second, may be obtained with simultaneous audio accompaniment.

Other objects and advantages of this invention will become obvious from the following description and drawings in which:

DESCRIPTION OF THE ILLUSTRATED EMBODIMENT CAMERA

Figure 1:
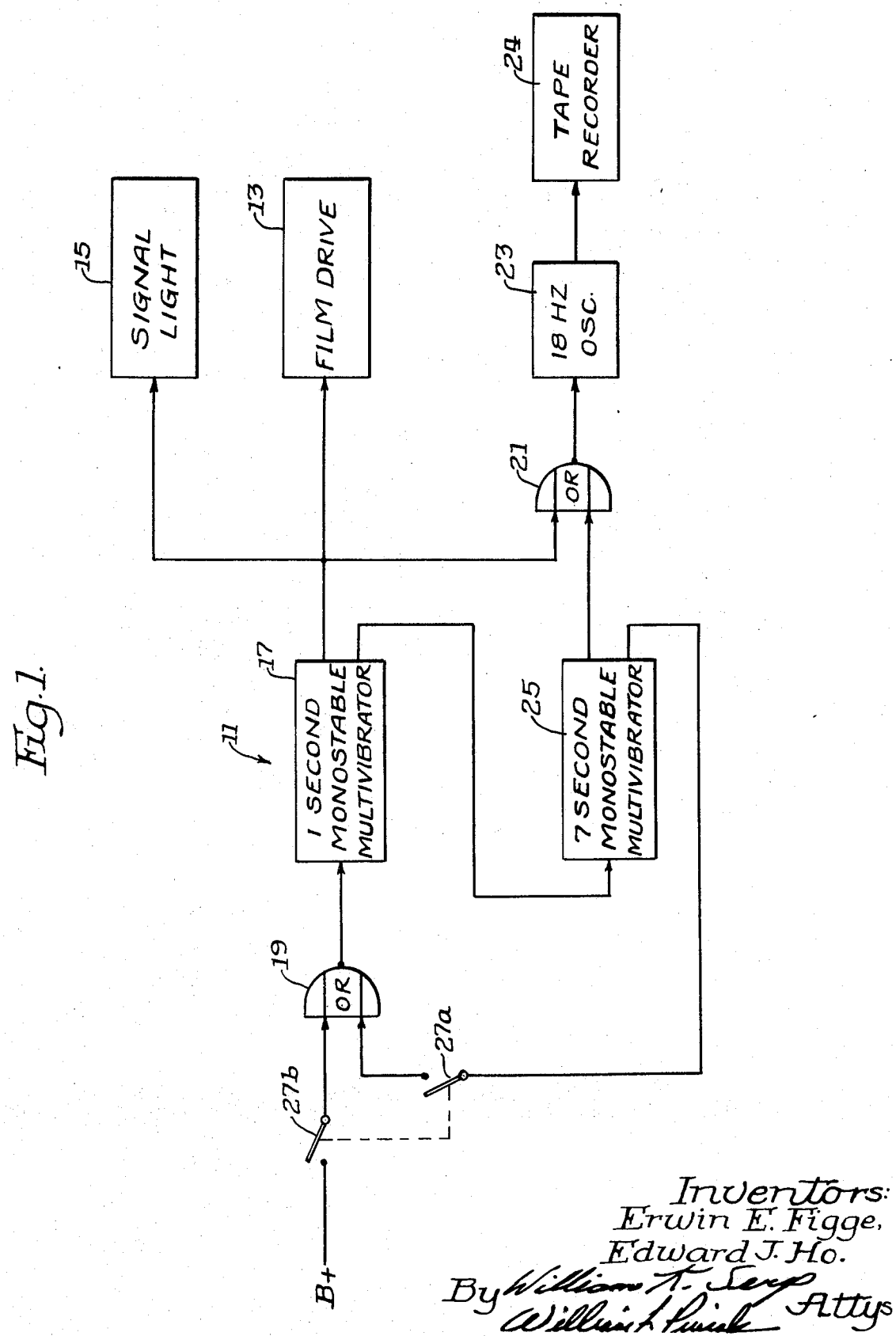
FIG. 1 is a diagram illustrating a portion of the camera of this system embodying certain features of this invention.

An embodiment of a camera 11 including certain features of this system is illustrated in FIG. 1. During operation, the scene to be projected at a slow speed is recorded at a conventional 18 frame per second rate. Thereafter, in response to coding upon the film, the projector is switched to a much slower rate such as 2 frames per second. It should be noted, that the accompanying audio recording runs for a considerably greater period of time so that during projection, the audio sequence will terminate slightly before the related motion picture sequence. It will be further appreciated that exact sound-picture synchronization during slow motion projection is non-existent.

With reference to FIG. 1, the camera 11 includes a conventional film drive mechanism 13 and a signal exposure light 15. The signal light 15 is actuated concurrently with energization of the film drive mechanism 13 so as to provide a continuous exposed area along the margin of the film corresponding to those frames which are to be projected at a slow motion rate. The film drive 13 and signal light 15 are controlled by a one-second timing means in the form of a mono-stable multivibrator 17. The multivibrator 17 is of the conventional construction and is set by a suitable input pulse applied through an OR gate 19 as will be further described. Thus, upon introduction of a pulse to the input of the mono-stable multivibrator 17, the multivibrator sets, energizing the signal light 15 and the film drive 13. Upon completion of the multivibrator period, it resets interrupting movement of the film within the camera and de-energizing the signal light 15.

Upon setting of the mono-stable multivibrator 17, the output pulse is also passed through a second OR gate 21 to a recorder control unit in the form of an 18 hertz oscillator 23. The oscillator 23 feeds synchronization signals to the control track of a tape recorder 24, and further activates the recorder's tape drive mechanism. The synthetic synchronization signals are necessary since the film drive is functioning only during a portion of the time the recorder is operating. During normal operation, the film drive provides the necessary synchronizing pulses.

As will subsequently be described, the film drive is inoperative during a portion of the tape recorder operating interval and therefore, the 18 hertz oscillator is utilized to provide the synthetic synchronizing signals upon the recorded track. As previously mentioned, exact synchronization during film projection is non-existent.

The reset output of the one second multivibrator 17 is connected to the input of a second timing means in the form of a seven second mono-stable multivibrator 25. Thus, reset of the multivibrator 17 sets the multivibrator 25. The introduction of the pulse which occurs upon resetting of the one second multivibrator 17 and the setting of the seven second multivibrator 25 introduces an input to the OR gate 21 thereby maintaining the 18 hertz oscillator in operation for an additional seven seconds. It should be appreciated that the various timing intervals of the multivibrator and the projection speeds are mentioned to further clarify the operation of the illustrated embodiment and are exemplary and not in limitation of the invention described herein.

Briefly, in response to a pulse at the input, the one second multivibrator 17 sets activating the signal lamp 15, the film drive 13, the oscillator 23 and the tape recorder 24. The signal light and film drive run for approximately one second at which time the one second multivibrator resets. Upon reset, a pulse is applied to the seven second multivibrator 25 which holds the oscillator 23 and tape recorder on for an additional seven seconds for a total of eight seconds of operation. During projection, the film runs at a rate of 2 frames per second which is nine times as slow as the conventional rate of 18 frames per second. In this manner, the film sequence of nine seconds will outlast the corresponding eight second audio tape sequence thus assuring synchronization of the remaining film scenes.

Upon reset of the seven second multivibrator 25, the pulse output therefrom passes through one pole 27a of a double pole single-throw control switch to the second input of the first OR gate 19 for the reactuation of the one second multivibrator 17. So long as the double pole switch is depressed, the apparatus will continue to cycle causing the film drive to run for one second durations at seven second intervals and the tape recorder 24 will continuously operate.

A second pole 27b of the double pole switch is connected between a positive source of supply (not shown) and a second input of the first OR gate 19. In operation, the user may instantaneously depress the switch thus causing the one second multivibrator 17 to set and after a duration of one second causing the seven second multivibrator 25 to set for a total lapsed time of eight seconds. However, alternatively, the user may hold the switch depressed for a longer period of time causing the camera to continue operating at seven second intervals.

PROJECTOR

Figure 2:
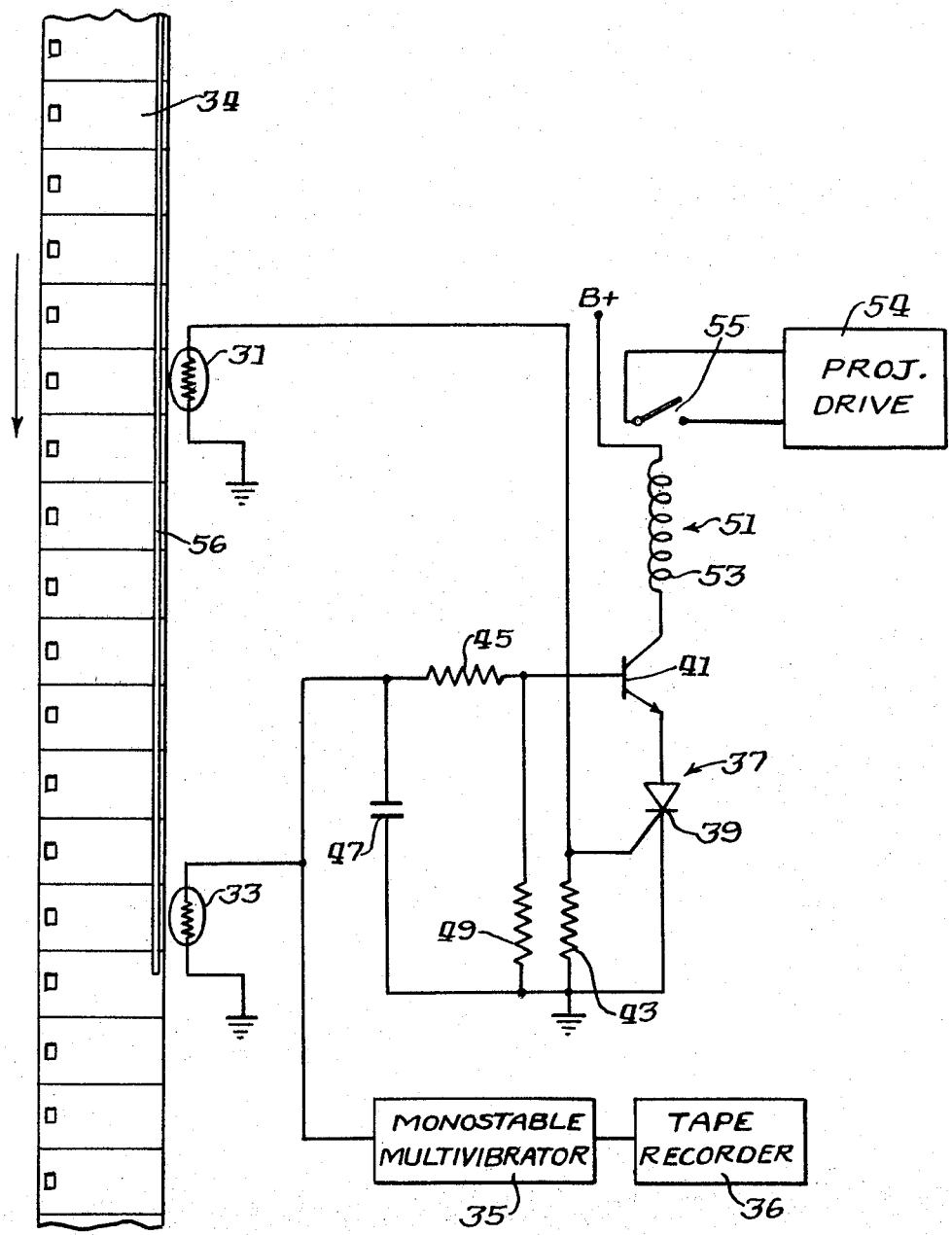
FIG. 2 is a symbolic diagram illustrating a portion of a film projector of this system including certain features of this invention.

With respect to FIG. 2, the projector of this system includes a pair of photoelectric cells designated first sensor 31 and a second sensor 33 numerically indicated in the direction of film travel. The output of the second sensor 33 is connected to a mono-stable multivibrator 35 the output of which in turn is connected for control of a tape recorder 36 carrying the prerecorded audio tape. During the normal 18 f.p.s. synchronized audio tape accompaniment of the type described in the afore-referenced patents, an exposed area along the margin of a film 34 is sensed by the second sensor 33 thereby setting the multivibrator 35 so as to switch into operation the tape recorder 36. In such instances, the film margin is light tranmitting for one or two frames. As taught by the referenced applications, upon completion of the recorded audio passage, the 1.6 kHz. burst signal which is recorded on the tape is sensed by the recorder for disablement thereof.

The output of the second sensor 33 is additionally applied to a control circuit 37 as is the output of the first sensor 31. The control circuit 37 includes a silicon controlled rectifier 39 the anode of which is connected to the emitter of a switching transistor 41 and the cathode of which is connected to ground. The gate of the SCR is connected through a resistor 43 to ground and to the output of the first sensor 31. The base of the transistor is connected through a base resistor 45 to the output of the second sensor 33. The output of the sensor is bypassed to ground by means of a capacitor 47. An additional biasing resistor 49 is connected between the base of the transistor 41 and ground. Serving to actuate a relay 51, the collector of the transistor is connected to one terminal of a solenoid 53 of the relay 51. The remaining terminal of the solenoid 51 is connected to a suitable low voltage supply (not shown). Switching a projector drive mechanism 54 to the two frame per second slow motion speed are normally open relay contacts 55.

For purposes of discussion, it will be assumed that a normal sound synchronized film is passing through the projector. As the first position of the abbreviated transparent area along the film margin passes the first sensor 31, an output signal is applied to the gate of the SCR 39. However, since there is no signal upon the transistor 41 base, the relay will not close. As the transparent mark passes the second sensor 33, the monostable multivibrator will set providing a pulse which turns on the tape recorder 36 and additionally biasing the transistor 41 into conduction. Since the gate of the SCR is void of a signal, it will not fire and the relay 53 which controls the slow motion projector drive mechanism will remain open.

For subsequent operational discussion, it will be assumed that an elongated light transmitting margin strip 56 corresponding to film saver operation is now passing through the projector. As previously mentioned, during the film saver operation of the camera, the exposure light is continuously energized during the entire film saver scene and therefore a continuous transparent mark is produced on the margin of the film. As the film moves through the projector, the control mark will eventually extend between the two sensors. At the precise moment when each of the sensors is positioned adjacent the exposure margin strip, a signal will be simultaneously applied to the gate of the SCR 39 and to the base of the transistor 41. The transistor 41 is now in conduction and upon firing of the SCR current passes through the relay solenoid 53 switching the projector to the slow 2 f.p.s. rate. Concurrently, the signal from the sensor 33 will set the multivibrator 35 actuating the tape recorder for normal operation. The film thus passes through the projector at a reduced rate of speed. As the film is shuttled through the projector, the first sensor will be the first photocell to detect the absence of the exposed margin strip and will turn off the gate signal of the SCR; however, it will be appreciated that to turn the SCR off, it must be starved into non-conduction. Since a signal is still applied from the first photocell to the base of the transistor, the relay remains closed and the projector operates at slow speed. After the exposed margin area has passed the second sensor, the transistor 41 will be biased into non-conduction, starving off the silicon controlled rectifier 39, de-energizing the relay, and returning the projector to normal 18 frame per second speed.

As previously mentioned, the camera is controlled to run for approximately one second which will expose 18 frames and the recorder energized for eight seconds. During projection, the film is shown at a speed of approximately two frames per second and therefore the slow motion scene will require approximately nine seconds to pass the projection aperture. The tape recorder, on the other hand, runs for eight seconds thus assuring that the film projection will always outlast the audio accompaniment. In this manner, synchronization of successive film scenes projected at the normal 18 f.p.s. rate will be maintained. The continuous exposed strip upon the margin of the film will be present during slow projection for a total of nine seconds. The tape recorder, on the other hand, will run for eight seconds and thereafter will turn off by means of the aforementioned prerecorded burst on the tape. Turn off will necessarily occur before completion of the entire film saver scene. The mono-stable multivibrator 35 additionally serves to prevent reactuation of the tape recorder by the remainder of the exposed film margin. As previously mentioned, the tape recorder is activated upon setting of the mono-stable multivibrator; therefore, the multivibrator must be reset by the expiration of the film saver scene before the tape recorder can be reactivated.

While the invention has been particularly shown and described with reference to preferred embodiments thereof, it will be understood by those skilled in the art that various changes in form and detail may be made therein without departing from the spirit and scope of the invention.

What is claimed is:

1. In an audio-visual recording apparatus including a tape recorder and a camera the improvement comprising:
    a film drive;
    a signal light for providing an exposed strip along the margin of the film; and
    a selectively actuatable timing unit serving to simultaneously actuate said film drive, said signal light and the tape recorder;
    said timing unit including a first timing means for concurrently controlling the operation of said signal light and said film drive and including a second timing means controlling the operation of the tape recorder, said second timing means having a greater period than said first timing means;
    said signal light, said film drive and the tape recorder being connected to said timing unit for selective operation thereof over a predetermined operational period.

2. The apparatus of claim 1, wherein said second timing means controlling the operation of the tape recorder is actuated upon the expiration of the period of said first timing means.

3. The apparatus of claim 2, wherein said first and second timing means comprise first and second mono-stable multivibrators and wherein said second multivibrator is actuated upon the reset of said first multivibrator and wherein said tape recorder is actuated by said first multivibrator prior to the setting of said second multivibrator so that the period of actuation of the tape recorder is equal to the sum of the periods of each of said multivibrators.

4. The apparatus of claim 3, wherein the output of each of said multivibrators is coupled to an OR gate the output of which is fed to an oscillator in turn feeding the tape recorder for control thereof.

5. The apparatus of claim 4 which further includes a second OR gate the output of which is connected to the input of said first multivibrator, one input of said second OR gate being connected to the reset terminal of said second multivibrator so as to permit recycling of each of said multivibrators by a closed loop configuration.

6. A slow motion projection system including a projector for sensing an elongated exposed strip upon the margin of a film for the control for a tape recorder comprising a first sensor for sensing said exposed strip and a second sensor positioned downstream in the direction of film travel for sensing said exposed strip at a position spaced from said first sensor, the output of said second sensor being connected to the tape recorder for control thereof, means for changing the drive speed of said projector from a normal to a slow motion rate, and a control unit receiving the output of each of said sensors and serving to control said drive means in response to the combined operative condition of said sensors.

7. The projection system of claim 6, wherein said control unit includes a transistor and a silicon controlled rectifier in series configuration, said drive means responsive to the current flow through said series configuration for control thereof, the control element of said transistor being coupled to said second sensor and the gate of said silicon controlled rectifier being connected to said first sensor.

8. The projection system of claim 7 which further includes a relay the solenoid of which is in series with said transistor, silicon controlled rectifier configuration for energization of the current flow therethrough, the contacts of said relay being connected to said projector drive means.

9. The projector system of claim 8 which further includes a mono-stable multivibrator connected between the output of said second sensor and the tape recorder.

References Cited

UNITED STATES PATENTS 3,539,248  11/1970  Lancor _____ 352—12
3,288,550  11/1966  Saraber _____ 352—180

LOUIS R. PRINCE, Primary Examiner

F. SHOON, Assistant Examiner

U.S. Cl. X.R.

352—12, 17, 20, 24, 25, 92, 180